(12) United States Patent
Riffe

(10) Patent No.: US 8,831,571 B2
(45) Date of Patent: Sep. 9, 2014

(54) DYNAMIC TEXT COMMUNICATION ADMINISTRATION

(75) Inventor: Scott Riffe, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 337 days.

(21) Appl. No.: 12/891,876

(22) Filed: Sep. 28, 2010

(65) Prior Publication Data

US 2012/0077526 A1 Mar. 29, 2012

(51) Int. Cl.
| H04M 1/725 | (2006.01) |
| H04L 29/06 | (2006.01) |
| H04W 4/00 | (2009.01) |
| H04W 4/12 | (2009.01) |
| H04W 4/02 | (2009.01) |

(52) U.S. Cl.
CPC ........... *H04W 4/001* (2013.01); *H04W 4/12* (2013.01); *H04W 4/02* (2013.01)
USPC .................................. 455/412.1; 455/414.3

(58) Field of Classification Search
USPC .......... 455/412.1–414.4, 418–422.1, 432.2, 455/466, 550.1, 553.1, 556.1, 556.2, 557, 455/560–562.1, 459; 370/310.2, 328, 338, 370/312, 349, 351–356, 465–467, 471–476, 370/496, 522; 709/201–203; 333/412.1–414.4, 418–422.1, 432.2, 333/466, 550.1, 553.1, 556.1, 556.2, 557, 333/560–562.1

See application file for complete search history.

(56) References Cited

U.S. PATENT DOCUMENTS

| 2007/0011367 | A1* | 1/2007 | Scott et al. ...................... 710/48 |
| 2007/0143433 | A1* | 6/2007 | Daigle ........................... 709/207 |
| 2008/0207173 | A1* | 8/2008 | Jendbro ...................... 455/412.1 |
| 2009/0030933 | A1* | 1/2009 | Brezina et al. ................ 707/102 |
| 2009/0141875 | A1 | 6/2009 | Demmitt et al. |
| 2010/0035585 | A1 | 2/2010 | Hadinata et al. |
| 2010/0246791 | A1* | 9/2010 | Wang et al. .............. 379/201.02 |
| 2011/0087743 | A1* | 4/2011 | Deluca et al. ................. 709/206 |
| 2011/0087744 | A1* | 4/2011 | Deluca et al. ................. 709/206 |

\* cited by examiner

*Primary Examiner* — San Htun
(74) *Attorney, Agent, or Firm* — Baker & Hostetler LLP

(57) ABSTRACT

A system for administering text communications may be configured to determine if an incoming communication that includes text meets any of various criteria and respond based on that determination. A reply may include information based on the criteria or information related to how other messages with the same or similar criteria have historically been handled by a user. Reply communications may be in a different form than that of the incoming communication. Other actions may be taken in addition or instead of replying, including setting calendar reminders or tasks, and sending delegate notifications. Data used for determinations may be collected over time or gathered from external systems.

20 Claims, 11 Drawing Sheets

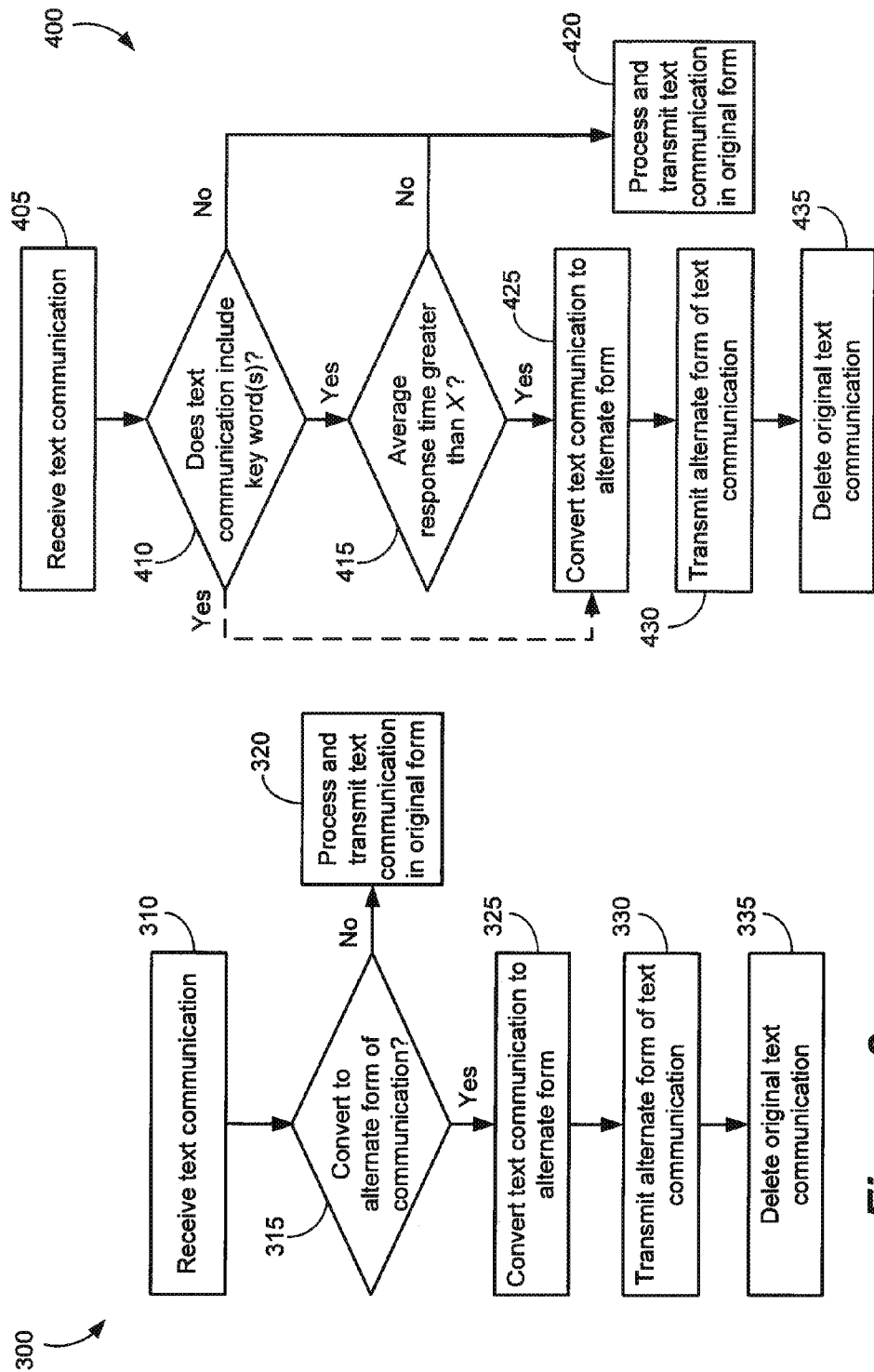

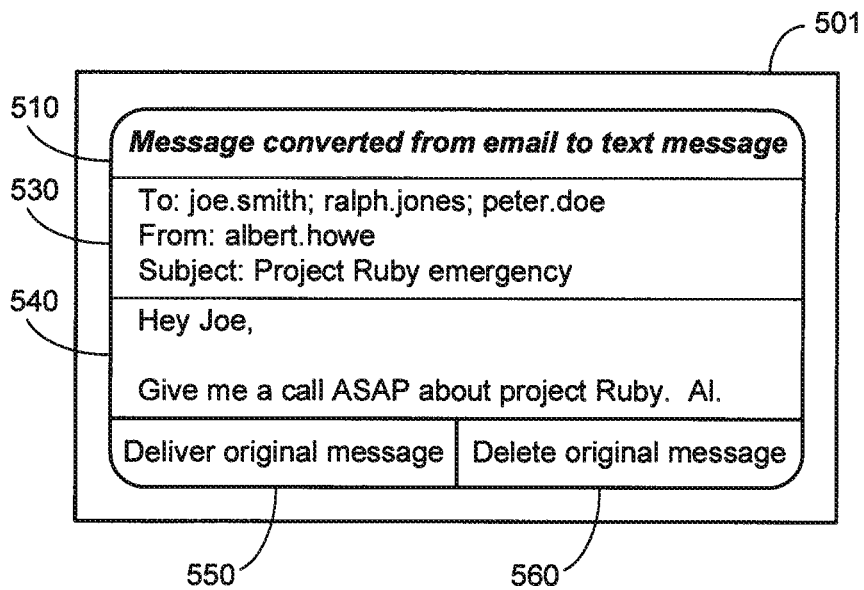
*Figure 5*
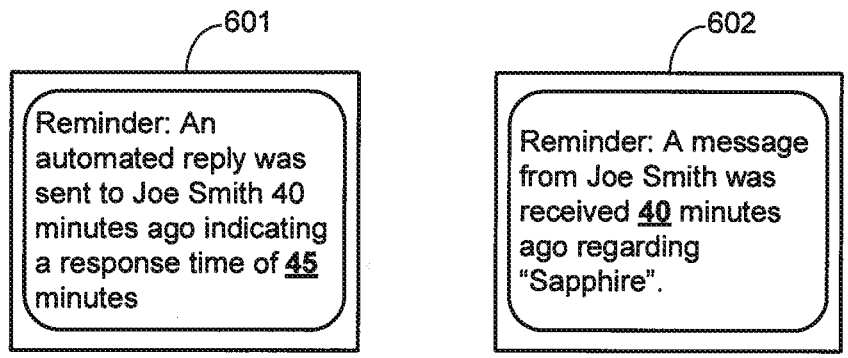
*Figure 6a*     *Figure 6b*
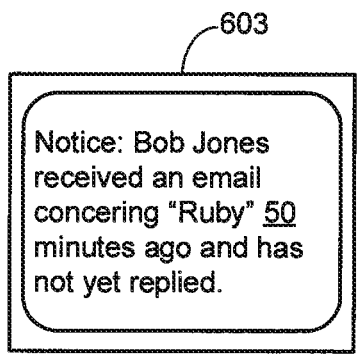
*Figure 6c*

DYNAMIC TEXT COMMUNICATION ADMINISTRATION

TECHNICAL FIELD

The technical field generally relates to wireless communications and more specifically relates to administration and flow control of text messages.

BACKGROUND

The popularity of electronic communications devices continues to increase worldwide as such devices become more powerful and less expensive. Today, it is not uncommon for a single portable device to provide multiple services to a user, including voice calling, text messages, email, internet access, instant messaging, multimedia content presentation, visual voicemail, and nearly any other function that may at one time have been restricted to a desktop computer, a television, or a landline telephone. However, some aspects of electronic communications have not progressed as quickly as others. When sending a text communication from one communications device to another, a sender typically receives no notification of whether the communication was received or read, or when a reply may be expected. Some systems allow for a "return receipt" that notifies the sender that a message has been read, while others allow a recipient to set up an auto-reply message that notifies a sender that the recipient is out of the office or provides some other information. However, a sender will not receive any notice of when a recipient may be able to reply to the sender or how long it may take for a recipient to read the communication. What is needed in the art are systems and methods for providing more granular feedback to a sender of text communications regarding the details of receipt of and reply to the text communications by the recipient.

SUMMARY

Systems and methods are disclosed for administering text communication. Such systems may be configured to determine if an incoming electronic communication that includes text, or a system associated with such a communication, meets any of various criteria and respond based on that determination. Among the various criteria may be the presence of one or more key words, the time of day the message was received, the number of other messages awaiting response, calendar data of a recipient, location data of a recipient, priority of the communication, the sender or organization associated with the communication, merely being a particular type of communication, or any other criteria as set forth herein. Based on the criteria, the system may determine additional data, such as an average time for response to similar messages, a location of the recipient, the time of day received, or any of the other communication-related data as set forth herein. A reply may automatically be sent based on these determinations and criteria, and in some embodiments such a reply may include these determinations and criteria, or related data. For example, a reply may provide a location update for the recipient, an estimated or average reply time for messages with similar characteristics, a number of other communications in the recipient's queue for reply, or any other information as set forth below.

Similar determinations may be made to determine what form the reply communication should take. A reply communication may be transmitted in the same form as the incoming communication, or in a different form. For example, an incoming email that contains a key word that is determined to be one of a set of key words may be replied to with an automated text message. Additional actions may also, or instead, be taken based on similar criteria and determinations. Such additional actions may include transmitting a notification to a delegate, setting a calendar reminder, and creating a new task The data used to make determinations may be obtained from other systems external to a dynamic text communication administration system or software. A dynamic text communication administration system or software may obtain data from email systems, text messaging systems, instant messaging systems, location services systems, and calendar systems. The data obtained may be further processed by the dynamic text communication administration system or software. For example, average response times may be calculated from timestamps of messages sent and received obtained from an email or text message system. In a newly activated dynamic text communication administration system or software, such data may be proactively collected upon activation so that the system or software can begin properly processing incoming communications. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 3 illustrates a non-limiting exemplary method of implementing dynamic text communication administration.

FIG. 4 illustrates another non-limiting exemplary method of implementing dynamic text communication administration.

FIG. 5 illustrates a non-limiting exemplary converted communication and related options that may be generated according embodiments disclosed herein.

FIGS. 6a-6c illustrate non-limiting exemplary automated reminders, notifications, and tasks that may be generated according embodiments disclosed herein.

DETAILED DESCRIPTION OF ILLUSTRATIVE EMBODIMENTS

Figure 1:
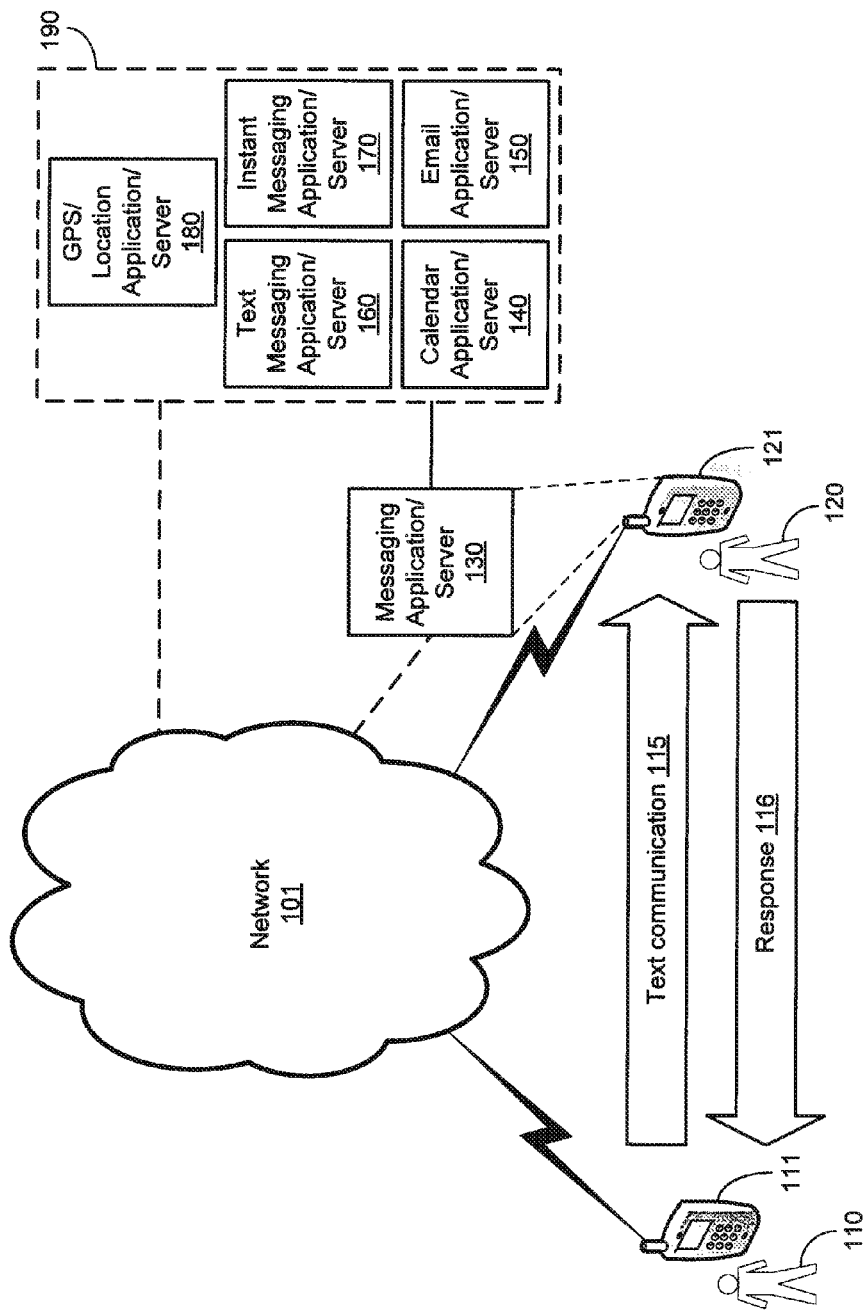
FIG. 1 is a block diagram of a network environment in which dynamic text communication administration may be implemented.

FIG. 1 illustrates a network environment in which one or more embodiments of a dynamic text communication administration system may be implemented. User 110 may operate wireless device 111. Wireless device 111 may be any type of wireless mobile communications device, including a mobile telephone, smart phone, personal data assistant (PDA), mobile computer, notebook computer, tablet computer, wireless email device, or any combination thereof. Alternatively, while wireless device 111 as illustrated represents a wireless mobile communications device, wireless device 111 may also represent a wired device, such as a landline telephone, computer, email device, any other communications device, or any combination thereof. All such embodiments are contemplated as within the scope of the present disclosure.

Wireless device 111 may communicate with network 101. Network 101 may be any type of network capable of providing wireless communications services and/or wired communications services to communications devices of any type. Network 101 represents any number of interconnected networks that may be composed of any number and type of wired and/or wireless network devices. Network 101 may enable wireless device 111 to communicate with devices accessible via network 101, including with other mobile devices. Additionally, network 101 may enable wireless device 111 to communicate with computing devices such as messaging application/server 130, and other applications/servers accessible via network 101 such as any of various services/applications represented by systems 190. Such communication may be voice, data, or a combination thereof. All such embodiments are contemplated as within the scope of the present disclosure.

In one embodiment, user 110 may operate wireless device 111 to transmit electronic text communication 115 to user 120, who may be operating wireless device 121, over network 101. Like wireless device 111, wireless device 121 may be any type of wireless or wired communications device. Text communication 115 may be any type of communication that includes text, such as a text message, an email, an instant message, a multimedia message, or any combination thereof. Text communication 115 may also include other forms of communication, such as voice communication, data, files (e.g., images, audio, video, etc.), or any combination thereof. In some embodiment, text communication 115 may originate as some other form of communication and may be translated, transcribed, or otherwise altered to include text. For example, user 110 may operate wireless device 111 to create a voice message that may then be transcribed by wireless device 111, or any other appropriately configured device, into text communication 115 containing the content of the voice message. Text communication 115 may be any other type of communication and may take any form at any point in its existence, and may be altered any number of times at any point between creation at wireless device 111 and receipt at wireless device 121. All such embodiments are contemplated as within the scope of the present disclosure.

Text communication 115 may be received at messaging application/server 130. Messaging application/server 130 may be any software, hardware, or combination of software and hardware configured to receive, process, and/or transmit text communications or any other type of communications to, from, or on behalf of wireless device 121. Messaging application/server 130 may be a separate physical device from wireless device 121, and may receive communications intended for wireless device 121 and then relay such communications to wireless device 121 via network 101, in some embodiments processing and/or altering such communications before transmitting them to wireless device 121. Alternatively, messaging application/server 130 may be one or more hardware and/or software components of wireless device 121, and may be physically within the housing of wireless device 121 or communicatively connected (wirelessly or hardwired) with wireless device 121. All such embodiments are contemplated as within the scope of the present disclosure.

Messaging application/server 130 may, upon receipt of text communication 115, process text communication 115 and generate response 116. Response 116 may be any type of communication, including a communication that includes text, such as a text message, an email, an instant message, a multimedia message, or any combination thereof. Response 116 may also include other forms of communication, such as voice communication, data, files (e.g., images, audio, video, etc.), or any combination thereof. In some embodiment, response 116 may originate as some other form of communication and may be translated, transcribed, or otherwise altered to include text. For example, user 120 and/or messaging application/server 130 may generate a voice message that may then be transcribed by wireless device 121, messaging application/server 130, or any other appropriately configured device, into response 116 containing the content of the voice message. Response 116 may be any other type of communication and may take any form at any point in its existence, and may be altered any number of times at any point between creation at messaging application/server 130 and receipt at wireless device 111. All such embodiments are contemplated as within the scope of the present disclosure.

Messaging application/server 130, in order to process received text communication 115, may obtain data from or otherwise interact with any or multiple of systems 190. Systems 190 may include any system, device, hardware, software, data, or any other form of system or information that may be used in processing a text communication. For example, included in systems 190 may be calendar application/server 140 that may be configured to store calendar data associated with user 120 and/or operate calendar software of any type. Email application/server 150 may be configured to store email data, transmit and receive email communications, present email to user 120, facilitate the composition of email by user 120, and/or operate email software of any type. Text messaging application/server 160 may be configured to store text message data, transmit and receive text messages, present text messages to user 120, facilitate the composition of text messages by user 120, and/or operate text messaging software of any type. Instant messaging application/server 170 may be configured to store instant message data, transmit and receive instant messages, present instant messages to user 120, facilitate the composition of instant messages by user 120, and/or operate instant messaging software of any type. Global positioning system (GPS)/location application/server 180 may be configured to store location data associated with user 120, transmit and receive location data, present location data to user 120, facilitate the acquisition of location data, and/or operate location-related software of any type. Systems 190 may also include any other systems, software, data, or devices that may be used in processing a text communication.

Note that any, any combination, or all of systems 190 (i.e., calendar application/server 140, email application/server 150, text messaging application/server 160, instant messaging application/server 170, GPS/location application/server 180, and any other system, software, data, or devices that may be used in processing a text communication) may be physically separate from messaging application/server 130, which may be communicatively connected to such system(s) directly, via network 101, or via alternate means. Such connectivity may be wired, wireless, or a combination thereof. For example, email application/server 150 may be located at a workplace and operated by user 120's employer, while GPS/location application/server 180 and/or text messaging application/server 160 may be operated by a wireless network provider of network 101 and messaging application/server 130 may be configured on wireless device 121. Alternatively, any combination, or all of systems 190 may be physically configured in the same housing or on the same system as messaging application/server 130. For example, all or a subset of systems 190 may be software configured on a single computer that is also configured to operate messaging application/server 130. Similarly, any combination, or all of systems 190 may be configured on wireless device 121. Any combination of such configurations is contemplated as within the scope of the present disclosure.

Data or information received from any of systems 190 may be used in processing text communication 115 by messaging application/server 130, in one embodiment at least in part to generate response 116. In some embodiments, response 116 may be generated automatically without direct involvement by recipient user 120. Response 116 may also be generated using preferences or other data provided by user 120 prior to receipt of text communication 115, in one embodiment in combination with data or information received from one or more of systems 190.

In an embodiment, messaging application/server 130 may use a current workload or message load in determining how to respond to text communication 115. In some of the following embodiments, for exemplary purposes a text message is described in relation to the embodiment. However, it is contemplated that such embodiments may also be used for email, instant messages, voicemail messages, visual voicemail, or any other type of communication.

Figures 2A, 2B, 2C:
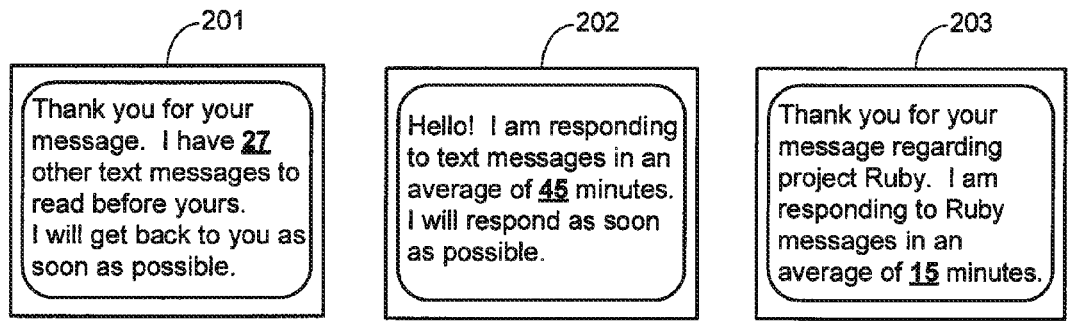
FIGS. 2a-2i illustrate non-limiting exemplary automated intelligent reply messages that may be generated according embodiments disclosed herein.

In such an embodiment, where text communication 115 is a text message, messaging application/server 130 may obtain current text message data, statistics, or other information from text messaging application/server 160. For example, messaging application/server 130 may determine, in one embodiment through interaction with text messaging application/server 160, that user 120 has a certain number of messages that have not yet been read by user 120. Messaging application/server 130 may then generate response 116 including a message that indicates the number of messages that have not been read or are otherwise in a queue to be read before text communication 115. FIG. 2a illustrates an example message 201 as may be rendered on a sender's device, such as wireless device 111. Message 201 may also include additional text, such as a short greeting, an assurance of prompt reply, or any other text, images, or data. Such additional information may be system- or user-configured, or a combination of both.

Referring again to FIG. 1, in another example, where text communication 115 is a text message, messaging application/server 130 may obtain an average response time for text messages from text messaging application/server 160. Alternatively, messaging application/server 130 may calculate or otherwise determine an average response time using current text message data, statistics, or other information obtained from text messaging application/server 160. For example, messaging application/server 130 may obtain the timestamps of text messages received for user 120 at text messaging application/server 160 and corresponding timestamps of reply messages over a certain period of time (e.g., one hour, six hours, 24 hours, etc.), and then calculate the average response time over that period of time. The period of time over which time data is collected may be configured by the system or may be user provided. For example, messaging application/server 130 may determine, in one embodiment through interaction with text messaging application/server 160, that user 120 is currently responding to text messages in an average of 45 minutes. Messaging application/server 130 may then generate response 116 including a message that indicates the average response time for user 120 to text messages. FIG. 2b illustrates an example message 202 as may be rendered on a sender's device, such as wireless device 111. Message 202 may also include additional text, such as a greeting, an assurance of prompt reply, or any other text, images, or data. Such additional information may be system- or user-configured, or a combination of both.

Referring again to FIG. 1, in another example, using text communication 115 as a text message for exemplary purposes, messaging application/server 130 may obtain or determine an average response time by user 120 for text messages based on the time of day. For example, messaging application/server 130 may determine that user 120 responds to text messages received from 8:00 AM until 12:00 PM in an average of 20 minutes, while responding to messages received from 12:00 PM until 8:00 PM in an average of one hour. User 120 may respond to text messages received any other time of day in an average of two hours. The various times of day and the period of time used to calculate an average response time may be configured by the system or may be user provided. For example, a user may configure messaging application/server 130, directly or indirectly through another system, to determine average response times for morning, afternoon, and evening times of day using the response times to message received during these times of day over the most recent week. Messaging application/server 130 may then generate response 116 including a message that indicates the average response time for user 120 to text messages in the time period in which the text message was received. Example message 202 illustrated in FIG. 2b may provide the average response time for a message received during a time of day rather than an overall average response time.

Referring again to FIG. 1, in another example, where text communication 115 is a text message, messaging application/server 130 may obtain or determine an average response time by user 120 for text messages based on the content of the text message. In such an embodiment, messaging application/server 130 may process text communication 115 to determine if text communication 115 includes any key words that may have been configured by user 120, directly or indirectly, on messaging application/server 130. For example, messaging application/server 130 may determine that user 120 has provided key words "Sapphire" and "Ruby", which may be project names of important projects on which user 120 works. Messaging application/server 130 may then determine if text communication 115 includes any text that corresponds to these key words. If so, messaging application/server 130 may then determine, in one embodiment using data obtained from text messaging application/server 160, an average response time for messages containing the detected key word(s). Messaging application/server 130 may then generate response 116 including a message that indicates the average response time for user 120 to text messages that contain the detected key word(s). Example message 203 illustrated in FIG. 2c may provide the average response time for a message that includes one or more particular key words. The key word(s) and other information may also be included in the message.

Figures 2D, 2E, 2F:
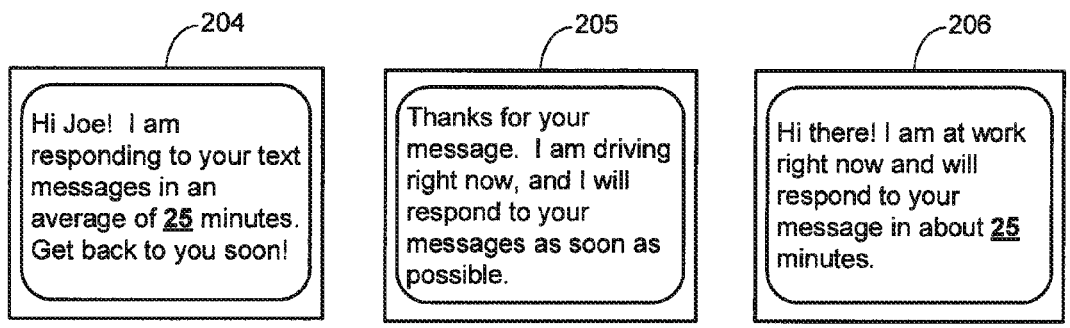

Referring again to FIG. 1, in another example, where text communication 115 is a text message, messaging application/server 130 may obtain or determine an average response time by user 120 for text messages based on the sender of the text message. In such an embodiment, messaging application/server 130 may process text communication 115 to determine the sender of the message, and then determine, in one embodiment using data obtained from text messaging application/server 160, an average time of response to text messages from the sender. For example, messaging application/server 130 may determine that the text message is from Joe Smith, and then obtain from text messaging application/server 160 an average response time for messages from Joe Smith. Alternatively, messaging application/server 130 may obtain from text messaging application/server 160 timestamps associated with message received from Joe Smith and replies to such messages, and then calculate the average response time over a period of time. The period of time over which an average response time may be determined may be system- or user-configured. Messaging application/server 130 may then generate response 116 including a message that indicates the average response time for user 120 to text messages from the sender. Example message 204 illustrated in FIG. 2d may provide the average response time for a message from particular sender, may also include a customized greeting based on the sender's name or identity, and may also include any other information.

Note that in some embodiments, rather than sender, an organization or company may be recognized, for example from the signature field of an email or the domain of a sender's email address, and similar calculations and messages may be generated by using reply times to messages from the determined organization or company or senders associated therewith. In other embodiments, other criteria may be used, such as communication priority or urgency. In systems that use predefined priority or urgency categories, indicators of the associated urgency or priority may be examined, for example by messaging application/server 130, text messaging application/server 160, and/or email application/server 150, and a determination may be made, based at least in part on the priority or urgency associated with a received communication, of an average response time of user 120 to messages with the same priority or urgency.

Referring again to FIG. 1, in another example, where text communication 115 is a text message, messaging application/server 130 may obtain or determine a location for user 120 and generate a response message based on the location. In such an embodiment, messaging application/server 130 may obtain location data from GPS/location application/server 180 and use that information to provide content for response 116. In an embodiment, messaging application/server 130 may determine that user 120 is in a moving vehicle, and send response 116 containing a message such as message 205 illustrated in FIG. 2e. Alternatively, messaging application/server 130 may obtain location data from GPS/location application/server 180 and determine an average response time by user 120 to messages received in the determined location. For example, text messaging application/server 160 may store user 120 location information for each message received and provide to messaging application/server 130 a response time for messages received when user 120 was in the user's current location. Messaging application/server 130 may then use that data to determine an average response time, and may provide an average response time message, such as message 206 of FIG. 2f. Message 206 may also include the location information (e.g., work, home, etc.) and any other information.

Figures 2G, 2H, 2I:
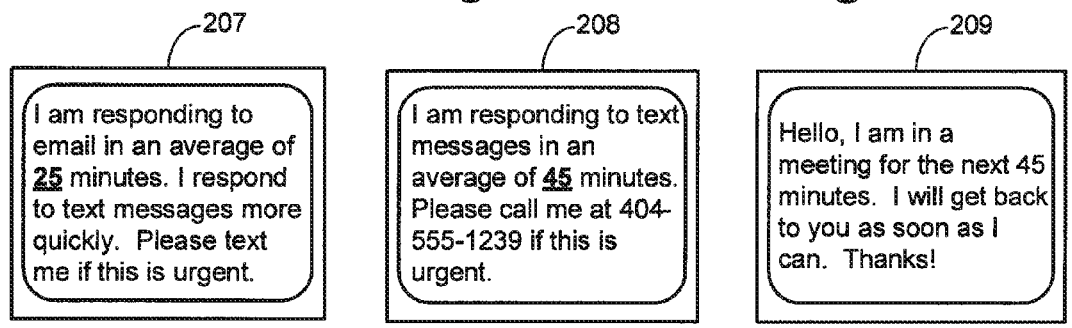

Referring again to FIG. 1, in another embodiment messaging application/server 130 may generate response 116 to include information providing a sender, such as user 110, with alternate means of communicating with user 120. For example, messaging application/server 130 may determine that the average response time of user 120 to an email is longer than the average response time of user 120 to a text message. Thus, messaging application/server 130 may generate a message such as message 207 in FIG. 2g to be transmitted with response 116. In another alternative, user 120's phone number may be provided as an alternate form of communication, as shown in FIG. 2h and exemplary message 208.

In another embodiment, referring again to FIG. 1, messaging application/server 130 may generate response 116 to include information about the current status of user 120 based on an appointment or other calendar data that may, in one embodiment, be obtained from calendar application/server 140. For example, upon receiving text communication 115, messaging application/server 130 may obtain calendar data from calendar application/server 140 indicating that user 120 is in a meeting, or otherwise determine that user 120 is not available due to an event on a calendar associated with user 120. Thus, messaging application/server 130 may generate a message such as message 209 in FIG. 2i containing an indication of when user 120 is likely to be able to respond. Such a message may be transmitted with response 116. Message 209 may include the amount of time remaining until user 120 is available, the time that user 120 may next be available, or any other information. Note that messaging application/server 130 may be configured to automatically respond with such calendar-based responses.

Note that in some embodiments, the response (e.g., response 116, messages 201-209) may be transmitted to the sender using the communication form as the original message (i.e., a text message is responded to with a text message.) Alternatively, any such response may be transmitted using an alternate form of communication. For example, a recipient, such as user 120, may have configured a system, such as messaging application/server 130, to provide automated intelligent replies via text message regardless of the form of incoming communication. Alternatively, such a user may have configured the system to send email responses to text message communications. Any of the various criteria described herein may be used determine the communication form of the response, including responding with a text message when response times are higher or when a message is of a higher priority or contains a key word. All such embodiments are contemplated as within the scope of the present disclosure.

In another embodiment, a message may be altered to another form or otherwise result in the generation of an alternate message based on data collected from the various systems described above. Method 300 illustrated in FIG. 3 illustrates one non-limiting method of performing such an alternate message generation. At block 310, a text communication may be received. Such a text communication may be of any type, including a text message, an email, an instant message, a multimedia message, and a transcribed voicemail message. At block 315 a determination may be as to whether the received communication should be transformed or converted into an alternate form. Note that while more specific embodiments are disclosed below, any criteria disclosed herein may be used to determine whether a text communication should be converted to an alternate form of communication. If not, then at block 320, the text communication may be normally processed and transmitted in its original form, which may include performing any of the processing described herein. If it is determined at block 315 that the received text communication should be converted to an alternate form, at block 325 any such conversion may be performed. For example, a text message may be converted into an email, an instant message, a voice message transmitted to a user via a voice call, or a voicemail message. Alternatively any of an email, an instant message, or a voicemail message may be converted into a text message. Any type of message may be converted to any other type of message, and any such conversion may be performed based on user preferences or any other system configuration. All such embodiments are contemplated as within the scope of the present disclosure.

At block 330 the alternate message generated at block 325 may be transmitted to the recipient. Note that included in blocks 325 and 330 may be a determination of an alternate destination for such messages. For example, messages may be transmitted to a wireless device rather than a computer email client if it is determined at block 315 that such messages are to be converted. At block 335, the originally received text communication may be deleted so that the recipient does not have two or more messages with the same content to manage and so that there is no confusion on the part of the user as to whether a message has been received or read. Alternatively, the original message may be automatically filed into a folder or some other form of storage or software container, or delivered in its original form to its original destination system or device. How the originally received text communication is handled may be determined by user configuration.

More specifically, text communications information, user preferences, and other data may be used to make a determination as to whether an incoming text communication should be converted to a different form, for example at block 315 of FIG. 3. Referring now to FIG. 4, method 400 illustrates a more specific embodiment of such a determination. At block 405, a text communication may be received. At block 410, a determination may be made as to whether the incoming text communication includes one or more key words. As noted above, such key words may be user-defined and may include any word that the user may wish to trigger an action in any embodiment disclosed herein. If the text communication does not include one or more key words, then at block 420, the text communication may be transmitted in its original form.

If, at block 410, it is determined that the text communication does include one or more key words, a system as disclosed herein may be configured to convert the received text communication to an alternate form (text message to email, instant message to voice recording, etc.) at block 425 and transmit the message in the alternate form at block 430. Alternatively, once a determination is made at block 410 that the received text communication includes one or more key words, at block 415 a determination may be made as to the average response time of a user for responding to such messages and whether that response time exceeds a threshold. The average response time may be calculated using any means or methods as described herein, and may be based on a time of day, a time period, and/or any other criteria set by a user and/or a system administrator. For example, a user may wish to receive any messages about a project as soon as possible. If the user is responding to email that reference the project within 15 minutes, the user may find email acceptable as a form of communication for text communications regarding the project. However, if the user is busy or otherwise unable to retrieve email regarding the project for longer than 15 minutes, the user may wish to have such emails converted to text messages and transmitted to the user's wireless device. According to such an embodiment, even if the text communication received at block 410 includes a key word, if the average response time is less than a configured threshold as determined at block 415, at block 420 the text communication may be processed (in an embodiment, using any processing as disclosed herein) and transmitted in its original form.

However, if at block 415 it is determined that the response time for responding to messages containing the detected keyword is greater than a configured threshold, at block 425 the text communication may be converted to an alternate form. This conversion may be of communication type, such as converting a message from a text message to an email, an email to an instant message, etc., or this conversion may be of destination, such as transmitting the text communication to an email client on a desktop computer rather than a wireless device, or vice versa. In some embodiments, at block 425 the text communication may be converted to another form of communication and the destination may be changed. For example, an urgent email that would originally be transmitted to a desktop computer email client may be converted to a text message that is addressed to the user's wireless device. Any combination of destination and communication form conversion is contemplated as within the scope of the present disclosure. At block 430, the alternate form of the text communication may be transmitted.

At block 435, the originally received text communication may be deleted so that the recipient does not have two or more messages with the same content to manage and so that there is no confusion on the part of the user as to whether a message has been received or read. Alternatively, the original message may be automatically filed into a folder or some other form of storage or software container, or delivered in its original form to its original destination system or device. How the originally received text communication is handled may be determined by user or system configuration.

In another alternative, a user may be provided an option to delete or deliver an original communication that has been converted to another communication form upon receipt of the converted communication. For example, as shown in FIG. 5, converted communication 501 may include some type of indication, such as text 510, that the converted communication has been converted from one form of communication to another. Original communication body 540 may be included in a converted message, as well as original communication sender and recipients 530. Also included with the converted communication may be options to delete, deliver, or perform any other tasks associated with the converted communication. For example, option 550 to deliver the original message may be selected by a user, and may result in the original communication being delivered in its original communication form. Option 560 may be selected by a user and upon selection may result in the original communication being deleted without being delivered in its original form. Any such actions, as well as the determination of whether a communication should be converted from one communication form to another and the actual conversion of the communication, may be performed by a messaging system, such as messaging application/server 130 of FIG. 1, or any other device, software, system, or combination thereof configured to perform these functions.

In an embodiment, a reminder or other notification may be provided to a recipient following the automated transmission of a response to a sender. For example, referring again to FIG.

1, if messaging application/server 130 has transmitted response 116 to user 110 indicating that user 120 responds on average within a particular amount of time, messaging application/server 130 may instruct calendar application/server 140 to set a reminder that will notify user 120 at the expiration of that particular amount of time. Such a reminder may be configured to be transmitted or otherwise presented to a user at or before the expiration of the estimated response time provided in the automated reply. FIG. 6a illustrates one example of such a reminder message. Note that such a reminder message may be transmitted using any communication form, and not only the communication form of the originally received communication or the automated replay communication. For example, if an email was received and then a reply was sent informing a sender that the user typically responds to such emails within an hour, if no follow-up reply has been sent, a system, such as messaging application/server 130, may be configured to send a reminder to the user via text message. Such reminder may also be typical calendar reminders that are presented via calendar software or an interface to such software. Any form of reminder is contemplated as within the scope of the present disclosure. Note that if a system, such as messaging application/server 130 or calendar application/server 140, detects that a reply communication has been composed and transmitted to the sender of the originally received communication, such a system may automatically remove or dismiss a reminder set when an automated reply to the originally received communication was set.

Alternatively, upon transmission of an automated reply to a received message as described herein, a task may be set in a task, workflow, calendar, or other task-related system. As with calendar reminders above, a task reminder may be provided to the recipient user of the need to reply to the originally received communication. Here again, if the task-related system detects that a reply communication has been composed and transmitted to the sender of the originally received communication, such a system may automatically remove or dismiss a task set when an automated reply to the originally received communication was set.

In other embodiments, a reminder or a task may be automatically set in response to receiving a communication without a reply communication being automatically generated. Any of the criteria set forth herein for determining when and how to automatically reply to a received communication may be used instead to determine when and how to set a task or reminder for a recipient user. For example, referring again to FIG. 1, messaging application/server 130 may receive text communication 115 and may determine that the message is of high priority, contains a certain key word, is from a particular sender, or otherwise meets some criteria configured on messaging application/server 130. Messaging application/server 130 may, in response, set a task or reminder to notify user 120 of the message and the need to reply. FIG. 6b illustrates such a reminder or task notification as reminder 602. Reminder 602 may be presented to the user through a calendar or task-related application or interface, or reminder 602 may be transmitted in any communication form. The choice of communication form for such reminders may be user-configurable or system-determined.

In another embodiment, a delegate may be notified of the need of a user to reply to a communication. Any of the criteria set forth herein may be used to determine when and how to notify a delegate. For example, referring again to FIG. 1, messaging application/server 130 may receive text communication 115 for user 120 and may determine that the message is of high priority, contains a certain key word, is from a particular sender, or otherwise meets some criteria configured on messaging application/server 130. Messaging application/server 130 may, in response, transmit a notification to, or set a task or reminder to notify, a delegate of user 120 of the message and the need to reply. Such a delegate may, for example, be user 120's supervisor or assistant, who may be tasked with or otherwise ultimately responsible for ensuring that user 120 replies to certain communications. Any such notification of a communication may be immediate, or may be sent at a later time, for example if it is determined that user 120 has not replied to a communication within a certain amount of time. Such an amount of time may be an average response time as described herein, or any other amount of time. FIG. 6c illustrates such a notification as notification 603. Notification 603 may be presented to the delegate through a calendar or task-related application or interface, or notification 603 may be transmitted in any communication form. The choice of communication form for such reminders may be user- or delegate-configurable or system-determined.

Figure 7:
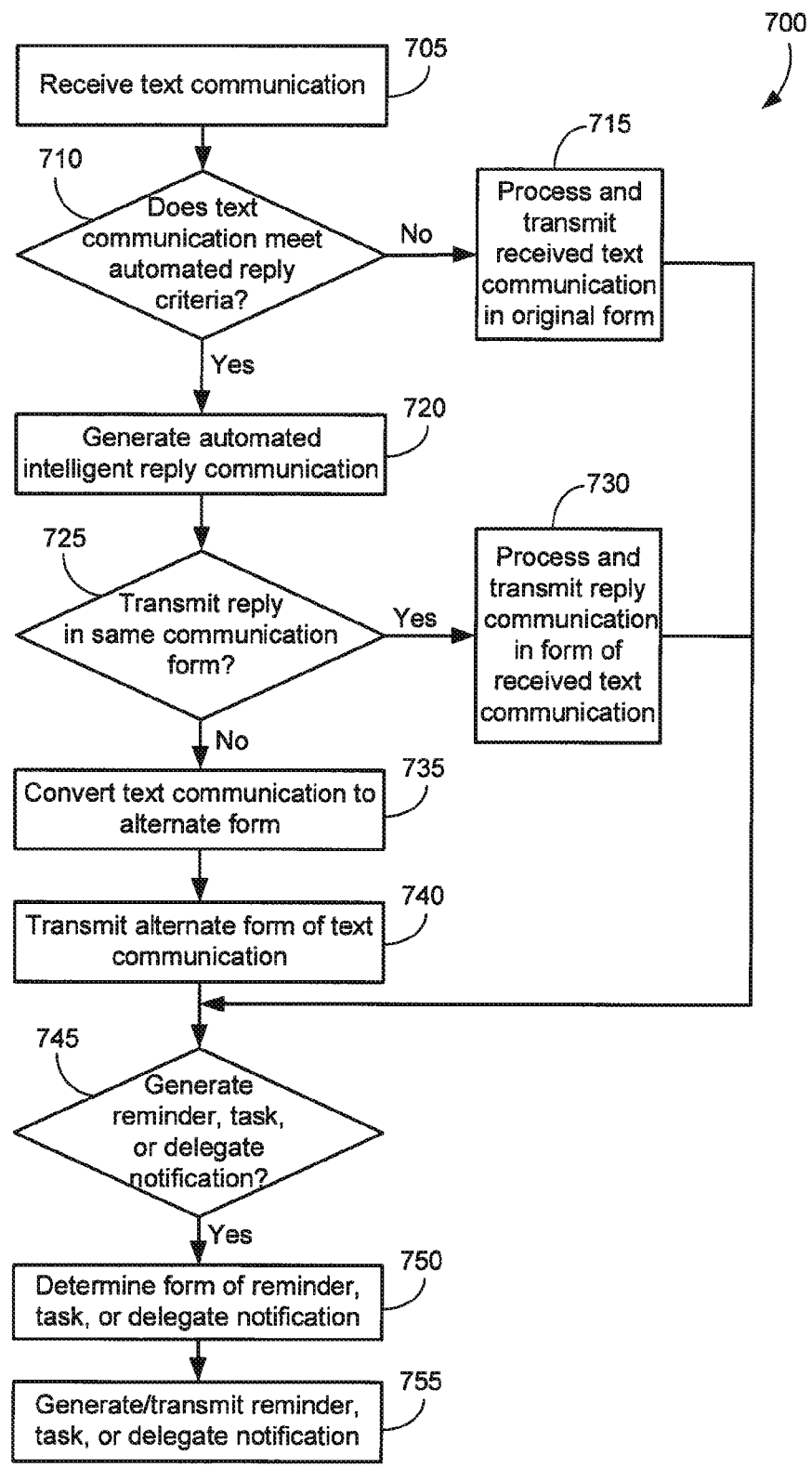
FIG. 7 illustrates a non-limiting exemplary method of implementing dynamic text communication administration.

FIG. 7 illustrates method 700 that may be used to implement any of the aspects described herein. While many of the aspects described herein are also described in method 700, any of the aspects described in method 700 may be implemented independent of and separately from any of the other aspects described in method 700. Moreover, any aspect of the present disclosure that is not described in method 700 may be implemented in conjunction with any or all of the aspects described in method 700. All such embodiments are contemplated as within the scope of the present disclosure.

At block 705, a text communication may be received. At block 710, a determination may be made as to whether the received text communication meets any of the criteria that may have been set for generating an automated reply communication. For example, any of the criteria and determinations described herein may be utilized at block 710, including, but not limited to, any criteria or determination described in references to FIGS. 1, 3, and 4. If no automated reply criteria are met, at block 715 the received text communication may be processed as needed and transmitted in its original form to the recipient.

At block 720, an intelligent reply communication may be generated. Note that the entire reply communication may be generated, including headers, formatting, etc., or only the content or other subset of the entire reply communication may be generated at block 720. Other systems may generate any remaining portion of a reply communication, and further processing of any reply communication may be performed outside the described systems.

At block 725, a determination may be made as to whether the reply generated at block 720 is to be transmitted in the same communication form as the text communication received at block 705. This may include determining if any criteria as described herein are met for converting a reply communication to a different communication form, for example, as described in reference to FIGS. 3 and 4. If the reply communication is to be transmitted in the same communication form, it is transmitted as such at block 730. If the reply communication is to be converted into another communication form, it is so converted at block 735, and transmitted in the alternate communication form at block 740.

At block 745, a determination is made as to whether a reminder, task, or delegate notification should be generated as described above. Note that this determination may be made regardless of whether a reply communication was generated, and regardless of the form of communication used for any generated reply communication. Note also that any number of such reminders, tasks, and/or delegate notifications may be generated, and any combination of these types of communications may be generated. If a reminder, task, and/or delegate notification is to be generated, the form of such a reminder, task, and/or delegate notification is determined at block 750, and the a reminder, task, and/or delegate notification is generated, transmitted, entered, or otherwise created at block 755. If no a reminder, task, and/or delegate notification is needed, in some embodiments no further actions may be taken.

In some embodiments, a dynamic text communication administration system as described herein may be implemented in a system or environment that already contains existing and in-use system with which the newly implemented dynamic text communication administration system may interact. For example, referring again to FIG. 1, messaging application/server 130 may be implemented after one or more of systems 190 are in operation. Therefore, a system such as messaging application/server 130 may be configured to communicate with one or more of systems 190 and obtain relevant information, data, communications, etc., so that such a system may be fully operational more quickly. For example, messaging application/server 130 may be configured to determine an average response time to certain, or all, communications in order to generate automated intelligent reply communications. Messaging application/server 130 may be configured to calculate the average response time over the course of the most recent week. However, the day that messaging application/server 130 is installed or otherwise activated, messaging application/server 130 may have no data regarding response times for any communications, and may therefore be unable to calculate an accurate average response time. In some embodiments, messaging application/server 130 may simply indicate no average response time in generated reply communications, or not send reply communications until after a week's worth of response time data is available.

Figure 8:
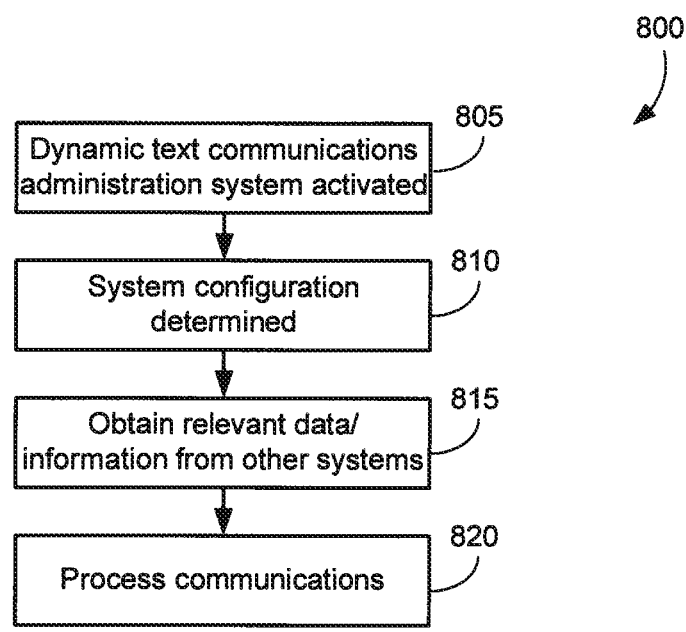
FIG. 8 illustrates another non-limiting exemplary method of implementing dynamic text communication administration.

Alternatively, a dynamic text communication administration system such as messaging application/server 130 may actively gather data so that it may operate at full effectiveness soon after activation. FIG. 8 illustrates method 800 of implementing such an embodiment. At block 805, a dynamic text communication administration system may be activated. At block 810, any configurations of such a system may be performed or otherwise detected. This may include configurations by a user and/or a system administrator, or default configurations.

At block 815, any data or information may be obtained from other systems. For example, raw data, such as timestamps, content, priority, etc. of emails, text messages, instant messages, etc. may be collected from servers, applications, software, and/or systems that may contain such data and/or are configured to provide such data (e.g., email servers, messaging servers, etc.) Alternatively, processed data, such as average response times, time periods associated with average response times, etc. may be obtained from similar systems. Any data that may be used to determine if any criteria as described herein are met, and any data that otherwise may be utilized in a dynamic text communication administration system may be obtained or otherwise determined at block 815. At block 820, processing of communications using the obtained data may commence.

Note that any of the embodiments described above or elsewhere herein may be combined in any fashion. For example, a dynamic text communication administration system may be configured to provide an average response time to senders of messages that include a particular key word, and may also be configured to provide a number of messages in the queue to senders of messages that do not have such key words. In another example, a dynamic text communication administration system may be configured to provide both a location and a number of messages in the queue to senders of messages. Any combination of the disclosed embodiments arranged in any configuration may be implemented, and all such embodiments are contemplated as within the scope of the present disclosure.

The methods and systems described above assist in managing communications of all types and increasing ease of use of messaging systems by enabling intelligent automatic response or reply to received messages. By implementing the present disclosure, the user experience is improved for both a sender and a receiver of messages. Set forth below are exemplary systems, devices, and components in which aspects of the present disclosure may be implemented.

Figure 9:
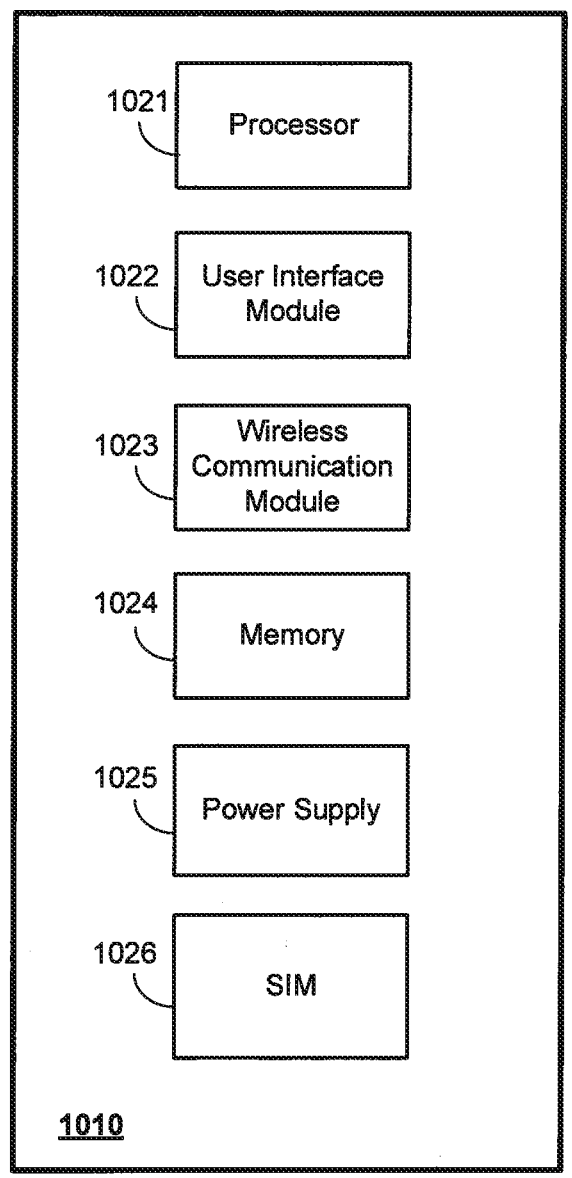
FIG. 9 is a block diagram of a non-limiting, exemplary wireless device in which dynamic text communication administration may be implemented.

FIG. 9 illustrates an example wireless device 1010 that may be used in connection with an embodiment. References will also be made to other figures of the present disclosure as appropriate. For example, wireless devices 111 and 121 may each be a wireless device of the type described in regard to FIG. 9, and may have some, all, or none of the components and modules described in regard to FIG. 9. It will be appreciated that the components and modules of wireless device 1010 illustrated in FIG. 9 are illustrative, and that any number and type of components and/or modules may be present in wireless device 1010. In addition, the functions performed by any or all of the components and modules illustrated in FIG. 9 may be performed by any number of physical components. Thus, it is possible that in some embodiments the functionality of more than one component and/or module illustrated in FIG. 9 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to dynamic text communication administration, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 101, GPS/location application/server 180, text messaging application/server 160, instant messaging application/server 170, calendar application/server 140, email application/server 150, messaging application/server 130, and/or any other type of wireless communications network or network equipment. Memory 1024 enables wireless device 1010 to store information, such as text communications content and associated data, multimedia content, software to interact with a dynamic text communication administration system, and dynamic text communication administration system preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 10:
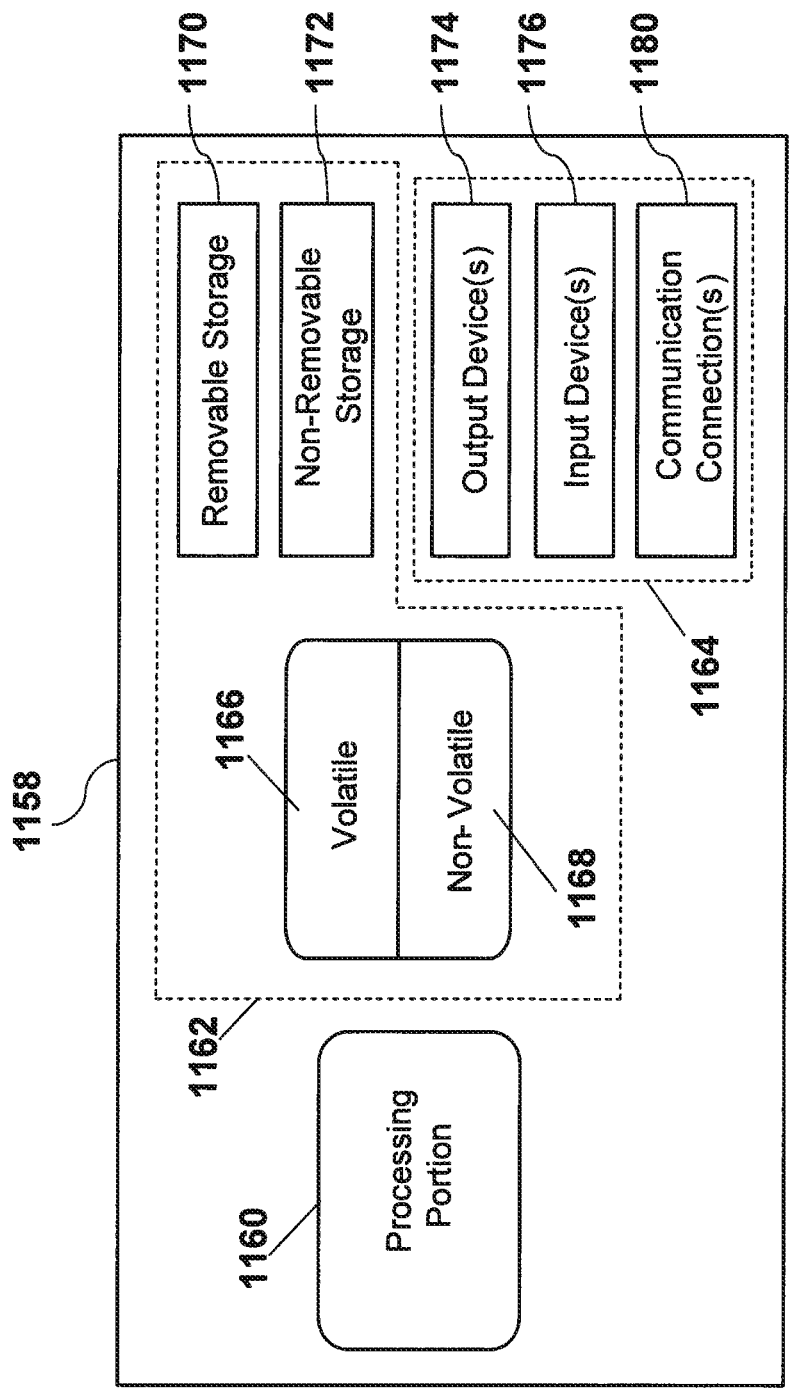
FIG. 10 is a block diagram of a non-limiting, exemplary processor in which dynamic text communication administration may be implemented.

FIG. 10 is a block diagram of an example processor 1158 which may be employed in any of the embodiments described herein, including as one or more components of wireless devices 111 and 121, as one or more components of network equipment or related equipment, such as any component shown in FIG. 1, and/or as one or more components of any third party system or subsystem that may implement any portion of the subject matter described herein. It is emphasized that the block diagram depicted in FIG. 10 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 10, the processor 1158 comprises a processing portion 1160, a memory portion 1162, and an input/output portion 1164. The processing portion 1160, memory portion 1162, and input/output portion 1164 are coupled together (coupling not shown in FIG. 10) to allow communications between these portions. The input/output portion 1164 is capable of providing and/or receiving components, commands, and/or instructions, utilized to, for example, establish and terminate text communications sessions, transmit and receive text communications related data, transmit, receive, store and process text communications, execute software to interact with a dynamic text communication administration system, receive and store dynamic text communication administration system preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing text communications, text communications-related data and/or content, voice calls, other telephonic communications, etc. For example, the memory portion is capable of storing dynamic text communication administration system preferences and/or software capable of processing text communications, operating a dynamic text communication administration system client, receiving, text communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 may also contain the communications connection(s) 1180 that allow the processor 1158 to communicate with other devices, for example through network 101 as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 101 illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how a dynamic text communication administration system may be implemented with stationary and non-stationary network structures and architectures in order to provide integrated visual voicemail communications. It can be appreciated, however, that dynamic text communication administration systems such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for dynamic text communication administration can be applied independently of the method of data transport, and do not depend on any particular network architecture, or underlying protocols.

Figure 11:
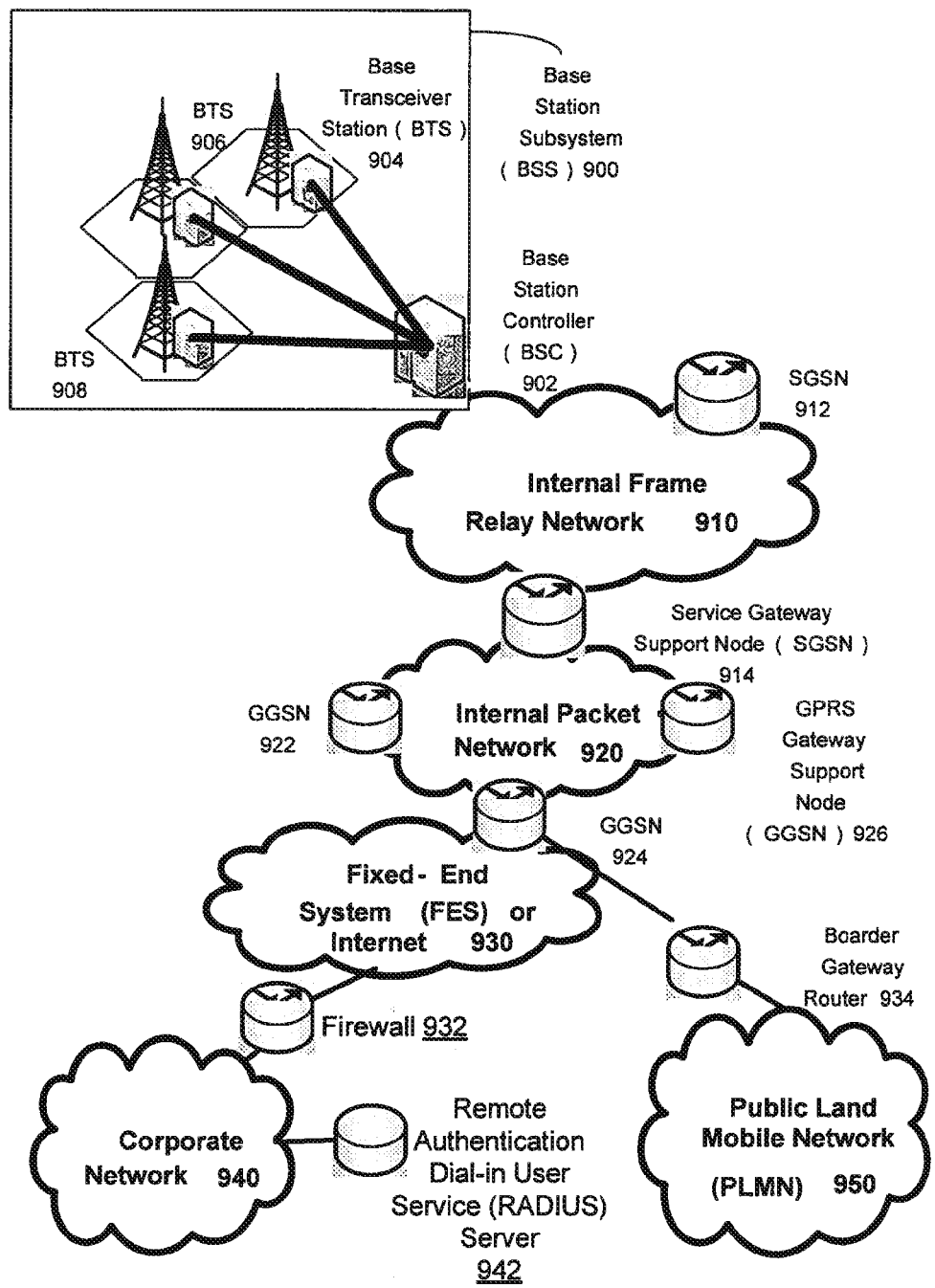
FIG. 11 is a block diagram of an exemplary packet-based mobile cellular network environment, such as a GPRS network, in which dynamic text communication administration may be implemented.

FIG. 11 depicts an overall block diagram of an exemplary packet-based mobile cellular network environment, such as a GPRS network, in which the systems and methods for dynamic text communication administration such as those described herein can be practiced. In an example configuration, network 101 as illustrated in FIG. 1 may be encompassed by or interact with the network environment depicted in FIG. 11. Similarly, wireless devices 111 and/or 121 may communicate or interact with a network environment such as that depicted in FIG. 11. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111 and 121) become connected to the wireless network. In exemplary fashion, the packet traffic originating from user devices (e.g., wireless devices 111 and 121) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 12:
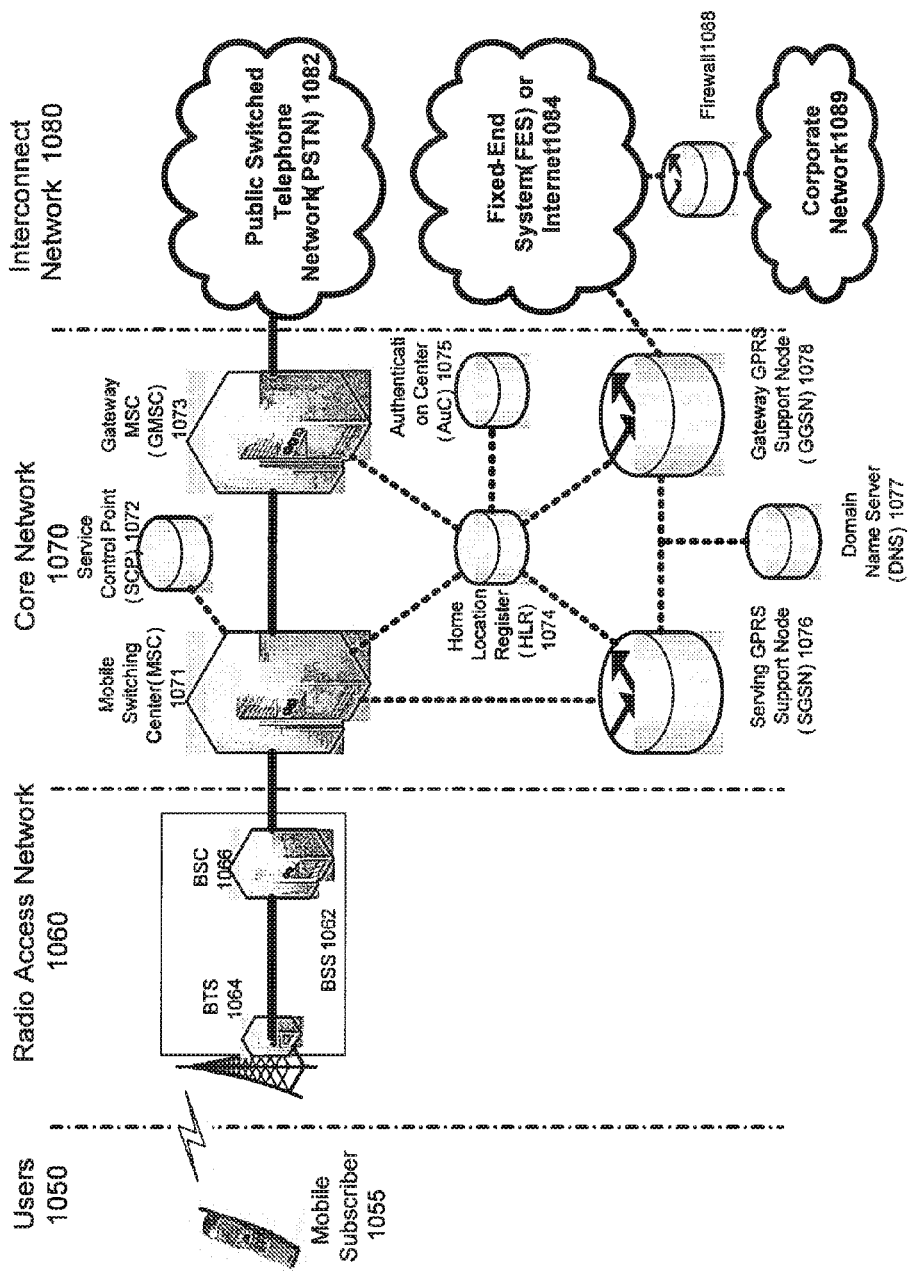
FIG. 12 illustrates a non-limiting, exemplary architecture of a typical GPRS network, segmented into four groups, in which dynamic text communication administration may be implemented.

FIG. 12 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 12). In an example embodiment, the device depicted as mobile subscriber 1055 may comprise wireless devices 111 or 121. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 12, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111 and 121, used by an end user of a mobile cellular service or a wireless provider. When a mobile subscriber turns on his or her mobile device, the mobile device may go through an attach process by which the mobile device attaches to an SGSN of the GPRS network. In FIG. 12, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of dynamic text communication administration such as those described herein can include but are not limited to Gateway GPRS Support Node tables, Fixed End System router tables, firewall systems, VPN tunnels, and any number of other network elements as required by the particular digital network.

Figure 13:
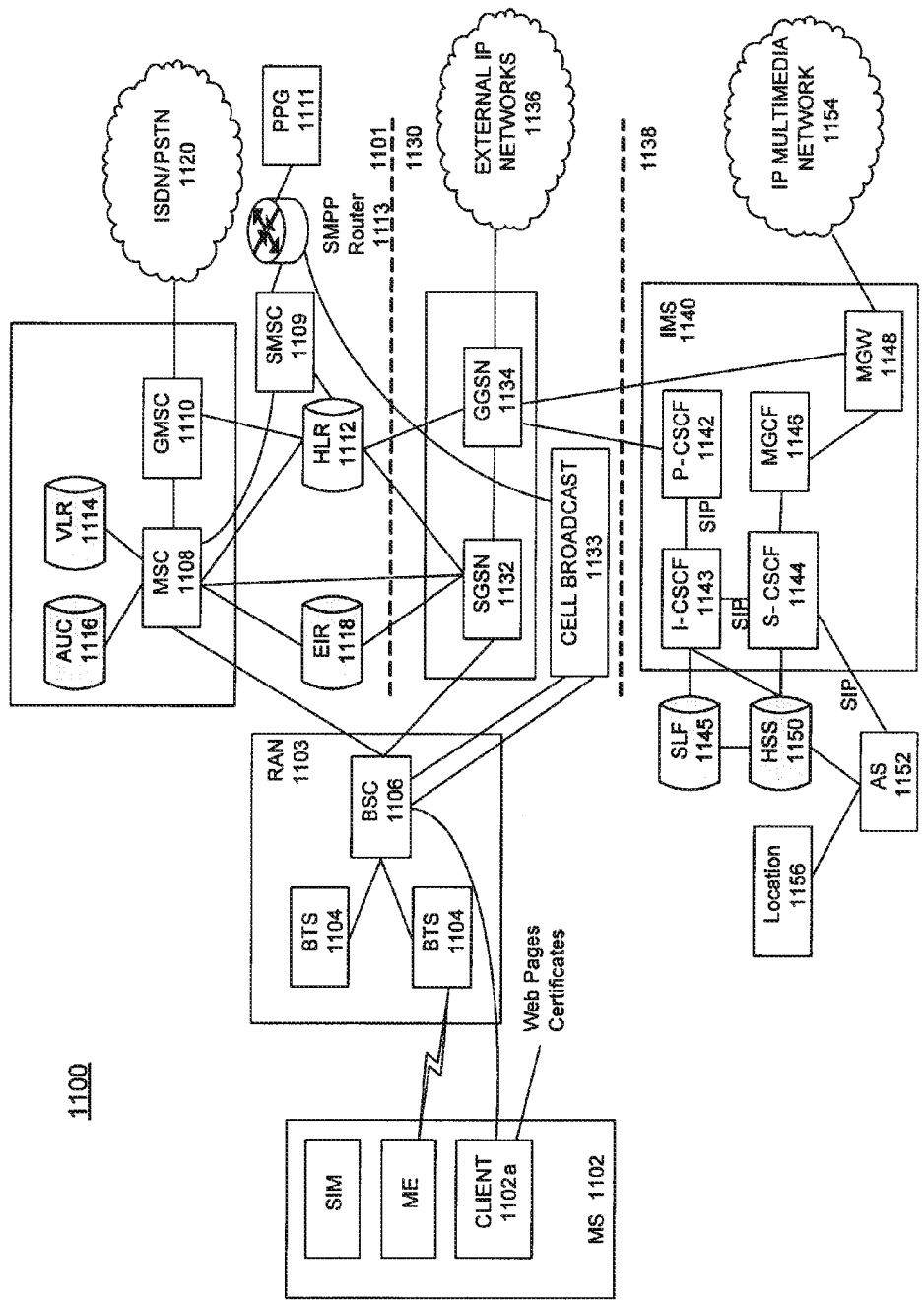
FIG. 13 illustrates a non-limiting alternate block diagram of an exemplary GSM/GPRS/IP multimedia network architecture in which dynamic text communication administration may be implemented.

FIG. 13 illustrates another exemplary block diagram view of a GSM/GPRS/IP multimedia network architecture 1100 in which the systems and methods for dynamic text communication administration such as those described herein may be incorporated. As illustrated, architecture 1100 of FIG. 13 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111 and 121) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for dynamic text communication administration have been described in connection with various communications devices and computing devices/processors, the underlying concepts can be applied to any communications or computing device, processor, or system capable of implementing the dynamic text communication administration systems and methods described. The various techniques described herein can be implemented in connection with hardware or software or, where appropriate, with a combination of both. Thus, the methods and apparatuses for dynamic text communication administration, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for dynamic text communication administration. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for dynamic text communication administration can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for dynamic text communication administration. When implemented on a general-purpose processor, the program code combines with the processor to provide a unique apparatus that operates to invoke the functionality of dynamic text communication administration as described herein. Additionally, any storage techniques used in connection with a dynamic text communication administration system can invariably be a combination of hardware and software.

While dynamic text communication administration systems and methods have been described in connection with the various embodiments of the various figures, it is to be understood that other similar embodiments may be used or modifications and additions may be made to the described embodiments for performing the same function of dynamic text communication administration without deviating therefrom. For example, one skilled in the art will recognize that dynamic text communication administration as described in the present application may apply to any environment, whether wired or wireless, and may be applied to any number of such devices connected via a communications network and interacting across the network. Therefore, dynamic text communication administration should not be limited to any single embodiment, but rather should be construed in breadth and scope in accordance with the appended claims.

What is claimed:

1. A method comprising:
   receiving an electronic communication comprising a user-composed body comprising text at a messaging server, wherein the electronic communication is in a first form;
   detecting a keyword in the user-composed body of the electronic communication;
   determining, based on the keyword, that a reply electronic communication is to be automatically generated;
   determining a subset of received electronic communications in the first form that each comprise a user-composed body comprising the keyword;
   determining an average response time for the subset of received electronic communications;
   determining that the average response time meets a threshold;
   responsive to determining that the average response time meets the threshold, generating the reply electronic communication comprising the average response time; and
   transmitting the reply electronic communication in the first form.

2. The method of claim 1, further comprising determining that the electronic communication has an associated priority.

3. The method of claim 1, wherein determining the average response time comprises determining the average response time over a predetermined time period.

4. The method of claim 1, wherein a body of the reply electronic communication further comprises the keyword.

5. The method of claim 1, further comprising setting a calendar reminder responsive to detecting the keyword.

6. The method of claim 1, further comprising determining that a sender of the electronic communication is one of a predetermined at least one sender.

7. The method of claim 1, further comprising:
   further responsive to determining that the average response time meets the threshold, determining a second form for the reply electronic communication that is different from the first form; and
   transmitting the reply electronic communication to a recipient of the reply electronic communication in the second form.

8. The method of claim 7, further comprising:
   determining that a criteria is met based on a characteristic of the electronic communication; and
   selecting the second form based on the second criteria.

9. A system comprising:
   a memory comprising instructions;
   a processor, wherein the processor, when executing the instructions, performs operations comprising:
      receiving, via a transceiver, an electronic communication comprising a user-composed body comprising text in a first form;
      detecting, by the processor, a keyword in the user-composed body of the electronic communication;
      determining, by the processor based on the keyword, that a reply electronic communication is to be automatically generated;
      determining, by the processor, a subset of received electronic communications in the first form that each comprise a user-composed body comprising the keyword;
      determining, by the processor, an average response time for the subset of received electronic communications;
      determining, by the processor, that a criteria is met based on the data the average response time meets a threshold;
      responsive to determining that the average response time meets the threshold, generating, by the processor, the reply electronic communication comprising the average response time; and
      transmitting, via the transceiver, the reply electronic communication in the first form.

10. The system of claim 9, wherein the operation of determining the average response time comprises determining the average response time over a predetermined time period.

11. The system of claim 9, wherein the operations further comprise transmitting, via the transceiver, the electronic communication to a recipient of the electronic communication in a second form that is different from the first form.

12. The system of claim 9, wherein a body of the reply electronic communication further comprises the keyword.

13. The system of claim 9, wherein the reply electronic communication further comprises a name of a sender of the electronic communication.

14. The system of claim 9, wherein the operations further comprise transmitting, via the transceiver, a notification to a delegate responsive to detecting the keyword.

15. The system of claim 9, wherein the operations further comprise setting, by the processor, a calendar reminder responsive to detecting the keyword.

16. The system of claim 15, wherein the operations further comprise transmitting, via the transceiver, the calendar reminder to a recipient of the reply electronic communication after an amount of time equal to the average response time has passed following receipt of the electronic communication.

17. A computer-readable storage medium that is not a transient signal, the computer-readable medium comprising computer-executable instructions, which when executed by a processor, cause the processor to perform operations comprising:

receiving an electronic communication comprising a user-composed body comprising text, wherein the electronic communication is in a first form;

detecting a keyword in the user-composed body of the electronic communication;

determining, based on the keyword, that a reply electronic communication is to be automatically generated;

determining a subset of received electronic communications in the first form that comprise a user-composed body comprising the keyword;

determining an average response time for the subset of received electronic communications;

determining that the average response time meets a threshold;

responsive to determining that the average response time meets the threshold, generating the reply electronic communication comprising the average response time; and transmitting the reply electronic communication in the first form.

18. The computer-readable storage medium of claim 17, wherein the operations further comprise transmitting the electronic communication to a recipient of the electronic communication in a second form that is different from the first form.

19. The computer-readable storage medium of claim 17, wherein a body of the reply electronic communication further comprises the keyword.

20. The computer-readable storage medium of claim 17, wherein the operations further comprise setting a calendar reminder responsive to detecting the keyword.

* * * * *